UNITED STATES PATENT OFFICE.

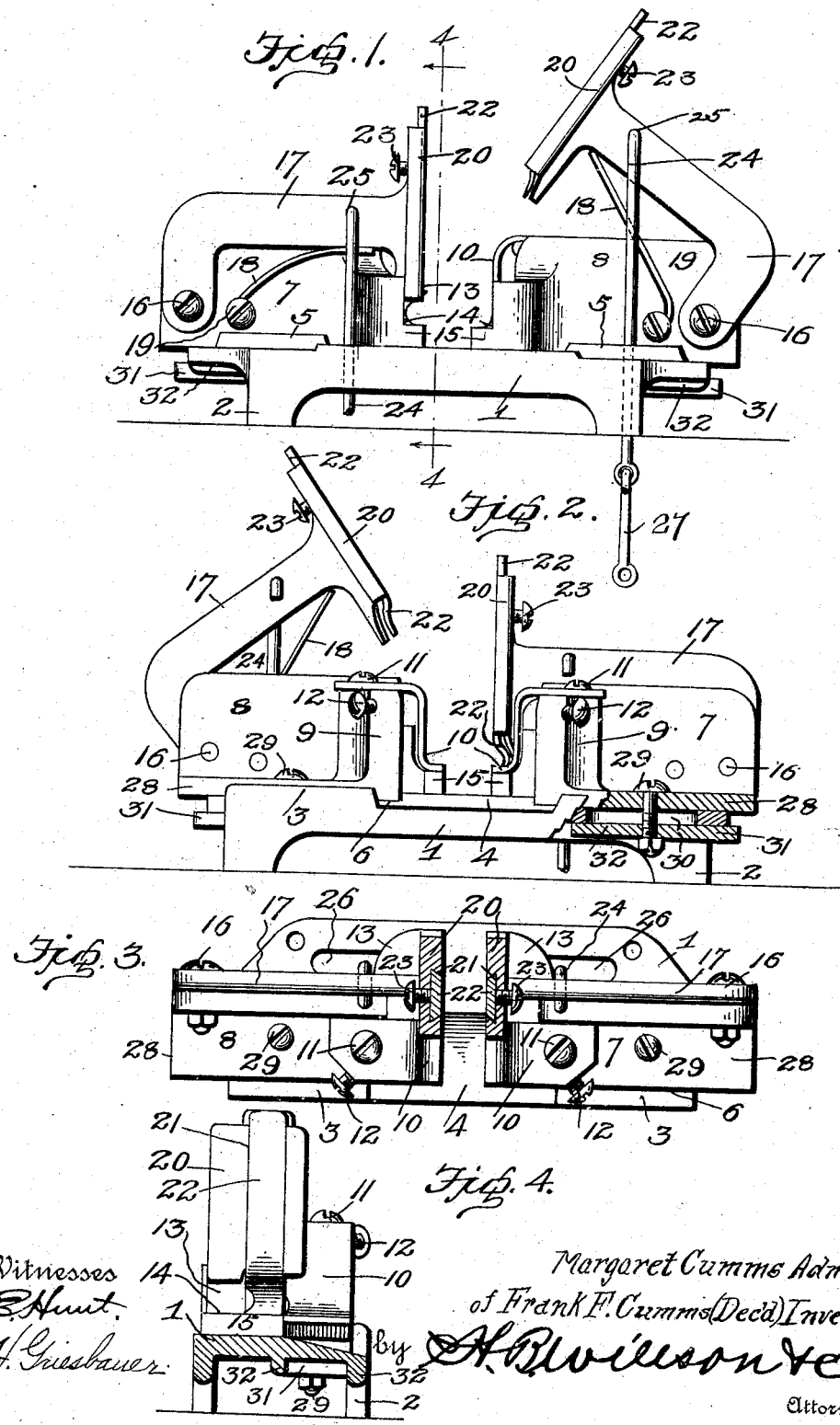

MARGARET CUMMS, OF CHICAGO, ILLINOIS, ADMINISTRATRIX OF FRANK F. CUMMS, DECEASED.

LEATHER-EDGING MACHINE.

947,054.  Specification of Letters Patent.  Patented Jan. 18, 1910.

Application filed November 2, 1908. Serial No. 460,796.

*To all whom it may concern:*

Be it known that I, MARGARET CUMMS, a citizen of the United States of America, and a resident of Chicago, in the county of Cook and State of Illinois, am the administratrix of the estate of FRANK F. CUMMS, late a citizen of said city, and that the said FRANK F. CUMMS did invent a certain new and useful Improvement in Leather-Edging Machines; and I do declare the following to be a full, clear, and exact description of the invention, such as will enable others skilled in the art to which it appertains to make and use the same.

This invention relates to leather edging machines, and particularly to that type which are adapted for use in edging and trimming harness straps and the like.

The object of the invention is to provide a device of this character which will trim all four sides of the strap at one operation, and which may be adjusted for any size strap.

A further object of the invention is the provision of means for adjusting the movable and stationary cutting knives jointly and for independently adjusting the movable knives with relation to their supporting arms.

With these and other objects in view, the invention consists of certain novel features of construction, combination and arrangement of parts, as will be more fully described and particularly pointed out in the appended claim.

In the accompanying drawings, Figure 1 is a side elevation showing one of the movable knives arranged in its lowermost position, and with parts of the machine shown in section, Fig. 2 is a rear elevation of the machine. Fig. 3 is a horizontal section, and Fig. 4 is a vertical section taken on the line 4—4 of Fig. 1.

Referring more especially to the drawings, 1 represents a suitable base or support, which is carried upon the usual legs 2. At one edge of the base there is provided an upstanding rib 3, and intermediate the length of the machine the rib is cut away to provide a recess 4, which is adapted to receive the shavings from the knife so that the operating parts will not be clogged. Intermediate the width of the machine and located at each end thereof there is provided ribs 5, which form with the rib 3 a channelway 6, adapted to receive the knife supporting members 7 and 8. Each of these knife supporting members is provided with laterally extending lugs 9, upon one side thereof, which are adapted to hold the stationary knives 10. These knives 10 are substantially S-shaped in formation, and have each right angular end thereof apertured to receive the attaching screw 11. The intermediate portions of the knives extend downwardly along side of the legs and parallel therewith, and are then bent inwardly toward each other as will be clearly seen from the drawings. Suitable adjusting screws 12 pass through the legs and engage the inner upper edge of the knives so that they may be adjusted vertically and in a rotary direction with respect to the other attaching screw 11. The opposite side of each knife supporting member 7 or 8 is provided with laterally extending ribs 13, which are recessed or cut away at 14, and are provided with rearwardly extending guides 15 upon which the strap travels.

At the opposite end of the knife supporting arms there is provided suitable pivoting pintles 16, which preferably comprise a screw bolt, and upon these pintles there is mounted the movable knife holding arms 17, normally held in raised position by the leaf springs 18, secured to the members 7 and 8 by the screws 19. At the inner end of these knife supporting arms there are integrally formed the transverse knife plates 20, having formed in their faces the dove-tailed slots 21, to receive the knives 22. A suitable set screw 23 passes through the back of each plate 20 and secures the knife in adjusted position. These knives extend downwardly below the plates and are bent at right angles to their normal plane and then re-bent to have a downward extension which is parallel with the normal plane. It will be seen that when both knife arms are down the strap will be trimmed upon its upper side by the right angular portion of the movable knives 2, and upon its lower side edges by the right angular lower ends of the knives 10.

In order to operate the arms simultaneously there is provided a pair of links 24, which engage apertures 25 in the arms and pass down through slots 26, formed in the base on either side of the ribs 13, and are connected together to a suitable operating rod 27, which may be operated by a foot lever or the like (not shown).

Each knife supporting member 7 and 8 is provided with a horizontal flange 28, through which is passed a set screw 29, adapted to travel through slots 30 and be engaged by suitable locking plates 31, which are held from turning between flanges 32 formed upon the base. By loosening the set screws 29 it will be seen that the knife supporting members with their respective arms may be moved away from each other thus adjusting the movable and stationary arms simultaneously while the movable arms may be adjusted vertically or independently by this movement, and the stationary knives may be adjusted vertically rotarily with respect to their pivotal points.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described the invention, what is claimed and is desired to be secured by Letters Patent is:—

In a device of the class described, a base, a pair of knife supporting members adjustably mounted on the base, knives adjustably mounted on said members, a pair of swinging arms pivoted to said knife supporting members and movable therewith, knives on said arms to coact with the knives on said members, springs carried by the members to freely engage said arms and normally hold the same in elevated position, means to simultaneously depress said arms to operating position, and means carried by the members to support and guide the material to the knives.

In testimony whereof I have hereunto set my hand in the presence of two subscribing witnesses.

MARGARET CUMMS,
*Administratrix of Frank F. Cumms, deceased.*

Witnesses:
Louis E. Bussiere,
Cyrus J. Wood.